United States Patent
Zeng

(10) Patent No.: US 6,756,700 B2
(45) Date of Patent: Jun. 29, 2004

(54) SOUND-ACTIVATED WAKE-UP DEVICE FOR ELECTRONIC INPUT DEVICES HAVING A SLEEP-MODE

(75) Inventor: Yu-Wen Zeng, Taipei Hsien (TW)

(73) Assignee: Kye Systems Corp., Taipei Hsien (TW)

( * ) Notice: Subject to any disclaimer, the term of this patent is extended or adjusted under 35 U.S.C. 154(b) by 141 days.

(21) Appl. No.: 10/095,940

(22) Filed: Mar. 13, 2002

(65) Prior Publication Data

US 2003/0173829 A1 Sep. 18, 2003

(51) Int. Cl.⁷ .................................................. H02B 1/24
(52) U.S. Cl. ...................................................... 307/112
(58) Field of Search ......................... 307/112; 704/275; 340/825.69; 367/198; 345/158

(56) References Cited

U.S. PATENT DOCUMENTS

| | | | | |
|---|---|---|---|---|
| 5,854,621 A | * | 12/1998 | Junod et al. ................. | 345/158 |
| 6,070,140 A | * | 5/2000 | Tran ............................ | 704/275 |
| 6,606,280 B1 | * | 8/2003 | Knittel ........................ | 367/198 |

FOREIGN PATENT DOCUMENTS

| | | | | | |
|---|---|---|---|---|---|
| JP | 11212721 A | * | 8/1999 | ........... | G06F/3/033 |
| JP | 11224158 A | * | 8/1999 | ........... | G06F/3/033 |
| JP | 11242560 A | * | 9/1999 | ........... | G06F/3/033 |

* cited by examiner

Primary Examiner—Gregory J. Toatley, Jr.
(74) Attorney, Agent, or Firm—Bacon & Thomas, PLLC

(57) ABSTRACT

A sound-activated wake-up device generates a wake-up signal for ending a sleep-mode in response to the sound of friction between an operating platform and an input device, or the sound of touching of the input device by the user. The wake-up device includes a sound detecting unit and a signal amplifying/comparing unit, and sound filtering structures and/or circuitry so as to prevent ambient sounds from activating the wake-up device.

19 Claims, 3 Drawing Sheets

SOUND-ACTIVATED WAKE-UP DEVICE FOR ELECTRONIC INPUT DEVICES HAVING A SLEEP-MODE

BACKGROUND OF THE INVENTION

1. Field of the Invention

This invention relates to a wake-up device for electronic input devices having a power-saving sleep mode, and more particularly to a sound-activated wake-up device that causes an electronic input device to "wake-up" or terminate a power-saving sleep mode upon detection of a sound, in order to enable full-power operation of the device.

2. Description of Related Art

As electronic technology has progressed, electronic devices have become lighter, thinner, shorter, and smaller. In addition, there has been a trend toward devices having low power consumption. In the case of information processing facilities, such as computers, personal digital assistants (PDAs), and portable communication devices, which are becoming more and more popular, low power consumption has become a key selling point, particularly with respect to battery-powered input, output, and/or communications devices such as wireless communications handsets, electronic mouses, keyboards, trackballs, game controllers, PC cameras.

To achieve acceptably low power consumption, it has become necessary to include a power-saving or "sleep" mode in such devices. The sleep mode reduces power consumption to the minimum necessary to maintain essential functions when the device is not in use, by causing high energy consumption components such as central processing units (CPUs) or micro control units (MCUs) to stop running after a predetermined period of inactivity, thus extending the life of any batteries within the device. This is particularly important in wireless devices, for which batteries are likely to be the sole power source.

While most conventional power-saving or sleep-mode initiating circuits are essentially the same, wake-up devices vary widely. One type of conventional wake-up device, for example, periodically outputs a wake-up signal based on predetermined time intervals to check whether a user is operating the device. This type of wake-up device has the greatest power consumption, even when the checking process is relatively short, because the periodic supply of full power to the device occurs whether or not use of the device is desired. Another conventional type of wake-up device, on the other hand, detects a button clicking or movement of the device to initiate wake-up. Such a device, an example of which is disclosed in U.S. Pat. No. 5,854,621, while convenient in many ways, can cause problems in devices used as computer inputs since the button clicking will be taken as a command following wake-up. This which might result in undesirable occurrences such as the deletion of a file before the button-clicking user realizes that wake-up has already been completed and is able to appreciate the consequences of continued button pushing.

Other conventional wake-up devices detect the movement of an input device or other physical actions. For example, the device disclosed in Japanese Patent Publication No. JP11212721 generates a wake-up signal upon touching of the device, while Japanese Patent Publications JP11224158 and JP11242560 disclose devices that generate wake-up signals upon detection of vibrations. While these devices optimize power consumption for input devices connected to a computer, however, the power savings obtained are still not optimal since the devices will wake-up whether or not connected to a computer, and further are responsive to unintended as well as intended touches or vibrations.

Finally, yet another conventional wake-up device design proposed by Microsoft Corporation uses a detector to sense changes in an induced magnetic field between the user and the input device. This design has the disadvantages of requiring a periodic, albeit brief, wake-up to check the detector, and involves use of a relatively expensive magnetic field sensor.

In summary, despite the numerous different wake-up device designs that have previously been proposed, a wake-up device is still needed that initiates wake-up only in the presence of a user, without being subject to other environmental influences, and only under conditions in which full-power can be utilized, and yet that is small, lightweight, reliable, and relatively inexpensive.

SUMMARY OF THE INVENTION

It is accordingly an objective of the present invention to provide a wake-up device having a simple structure, that is low in cost, and that is easily carried, and that reliably initiates wake-up of an electronic device, such as an input device, only when necessary, i.e., in the presence of a user under conditions in which full-power to the electronic device can be utilized.

This objective is achieved, in accordance with the principles of a preferred embodiment of the invention, by providing a sound-activated wake-up device for use in a wireless input device having an MCU with a sleep mode function. By utilizing sounds as the activation source, and by choosing sounds having unique signatures or characteristics such as a particular range of frequencies or a low level, the wake-up device of the invention is capable of making finer distinctions as to the actual source than is possible with a vibration or field detector, thereby greatly improving the reliability by which the presence of a user can be detected and distinguished from background or ambient effects.

The sound-activated wake-up device of the preferred embodiment includes a sound detecting unit capable of detecting low level sounds such as the sound caused by friction between the input device and an operating platform, or a user touching the input device. A signal amplifying/comparing unit connected to the sound detecting unit analyzes received sounds and outputs a wake-up signal to the MCU if an appropriate sound is detected.

In order to precisely detect the selected sounds, the body of the input device is preferably made of a noise-proof material, and/or may include a noise or bandpass filter for eliminating background noise. The input device can be, but is not limited to, such electronic input devices as wireless mouses, wireless keyboards, wireless game controllers, PC cameras, and so forth.

Further objectives and advantages of the present invention will be more readily understood from the following detailed description when read in conjunction with the appended drawings.

DETAILED DESCRIPTION OF THE PREFERRED EMBODIMENTS

Figure 1:
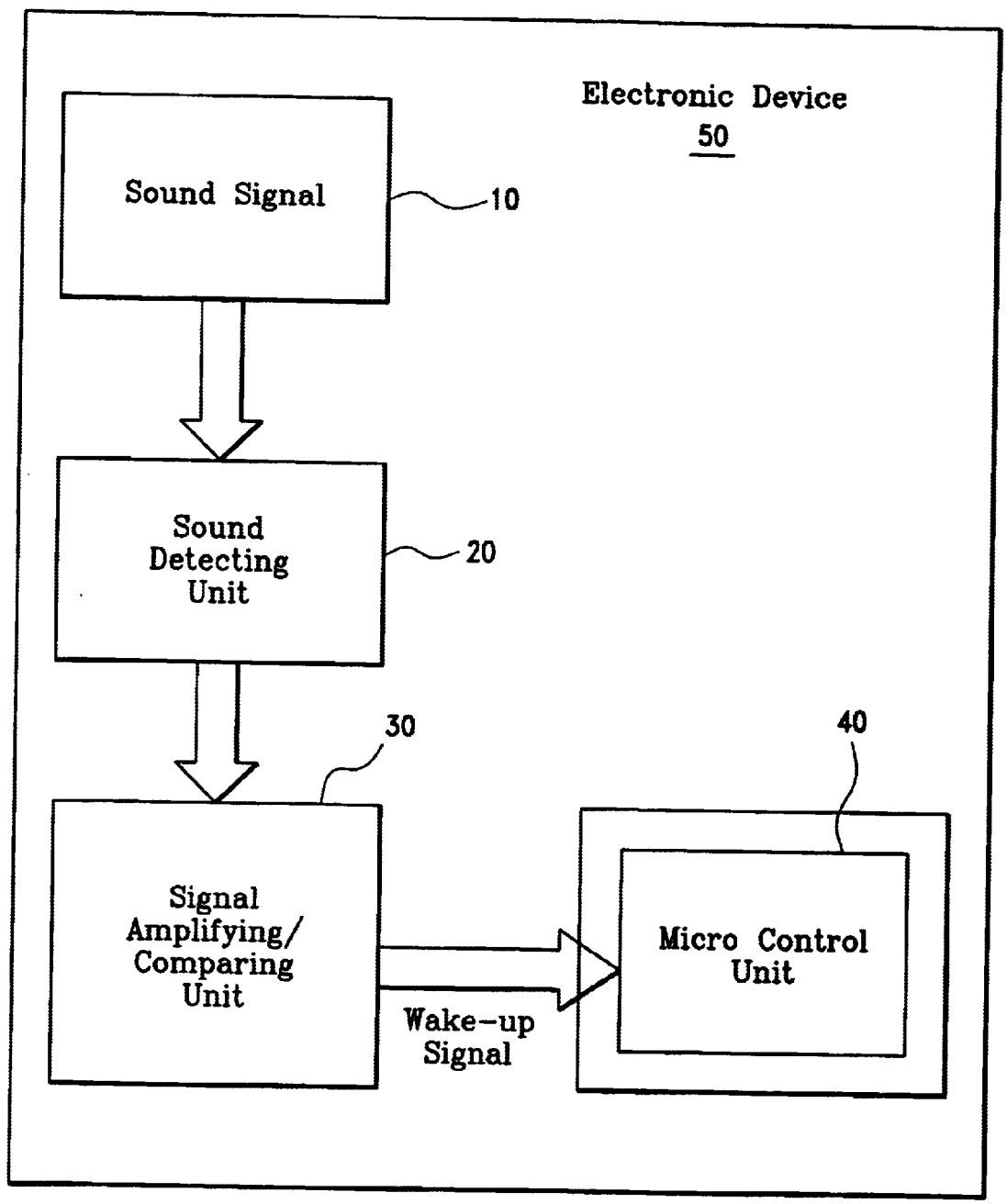
FIG. 1 is a block diagram of a sound-activated wake-up device constructed in accordance with the principles of a first preferred embodiment of the invention.

FIG. 1 shows a sound-activated wake-up device according to a first preferred embodiment of the invention, including a sound detecting unit 20 for detecting a predetermined sound 10 generated while the user is moving, operating, or touching the input device, and a signal amplifying/comparing unit 30 for analyzing the detected sound signal and generating a wake-up signal to wake-up MCU 40 from the sleep mode and turn on an input device (not shown) if the appropriate sound signal is recognized.

Those skilled in the art will appreciate that the wake-up device may be used in any electronic device having a sleep-mode, and in which sounds can be associated with the presence of a user. For example, the illustrated electronic device 50 may be a wireless mouse, and the predetermined sound may be, by way of example and not limitation, the sound caused by friction between the input device and the operating platform, i.e., a desk surface, mouse pad, or the like, or sounds caused by a user touching the mouse.

Figure 2:
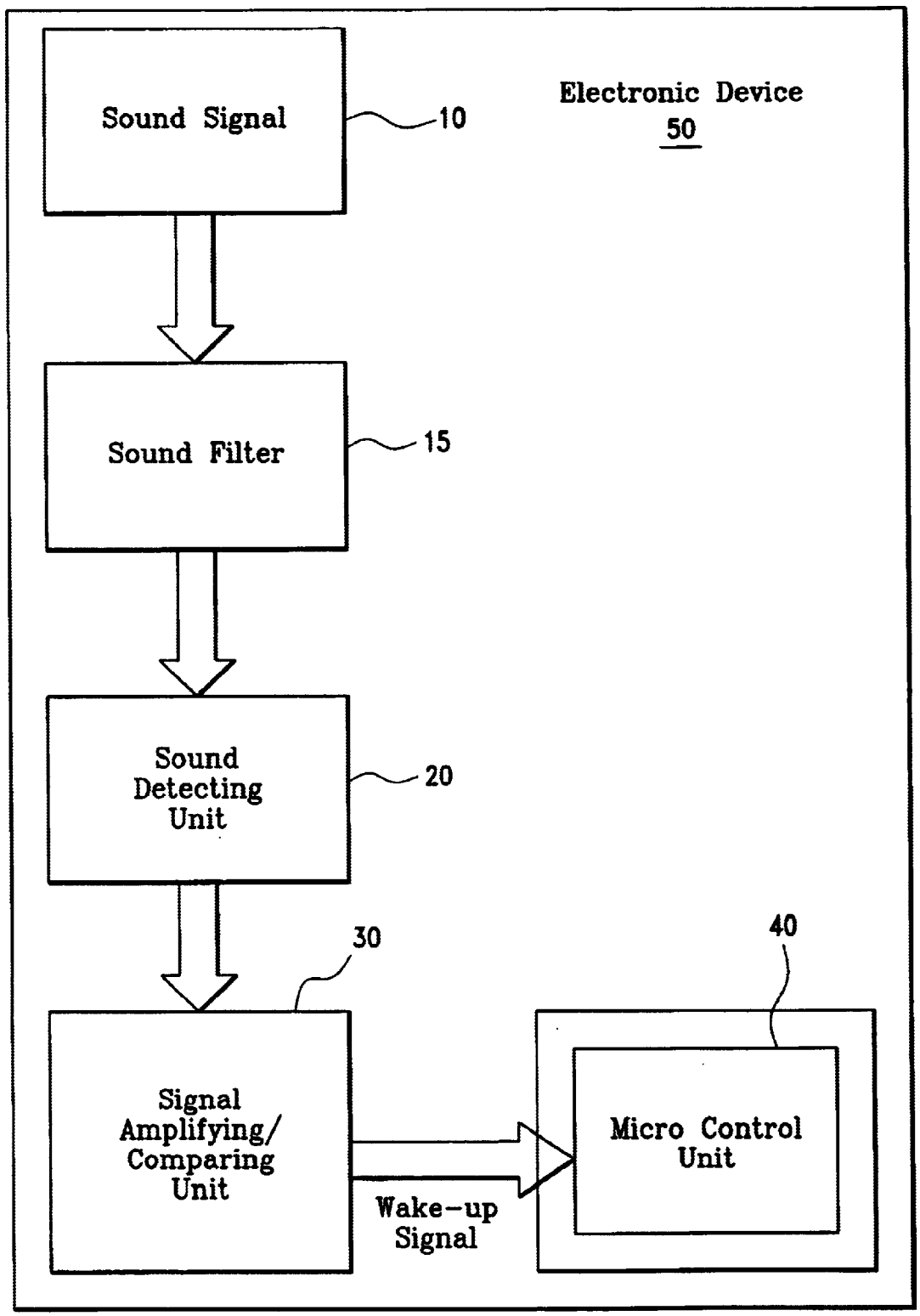
FIG. 2 is a block diagram of a sound-activated wake-up device constructed in accordance with the principles of a second preferred embodiment of the invention.

In many applications, it will be necessary to modify the embodiment shown in FIG. 1 to include some sort of sound filtering structure and/or circuitry. For example, the body or housing of the electronic device 50 in which the wake-up device is housed may include sound-proofing or absorbing materials, the sound detecting unit 20 can be limited to a certain frequency range of sensitivity likely to exclude background or undesired noises while responding to desired sounds, and/or the wake-up device may include a sound filter 15, as illustrated in FIG. 2. The sound filter may be a bandpass filter having a pass band that corresponds to the above-mentioned friction or touching sounds sought to be detected, as measured by appropriate tests.

Figure 3A:
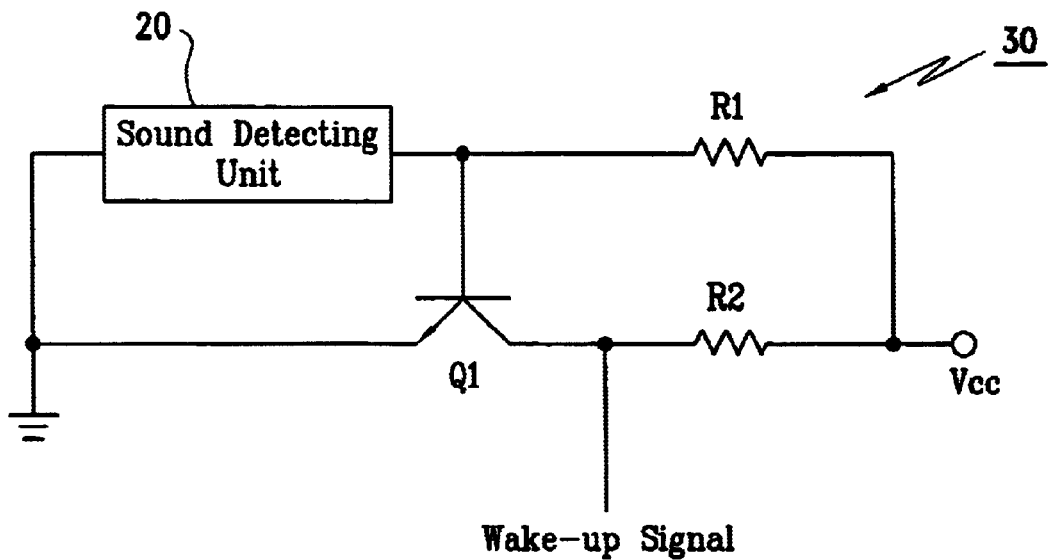
FIGS. 3A and 3B are schematic circuit diagrams showing preferred wake-up signal generating circuits that may be used in connection with the sound-activated wake-up devices illustrated in FIGS. 1 and 2.

Turning to FIG. 3A, the signal amplifying/comparing unit 30 may include a transistor Q1 having a base connected to sound detecting unit 20, and resistors R1 and R2 respectively connected between the base and collector of the transistor Q1 and a voltage source Vcc for biasing the transistor to a non-conductive state and for generating a wake-up signal when the sound detecting unit generates a voltage and therefore causes a voltage to appear at the collector.

Figure 3B:
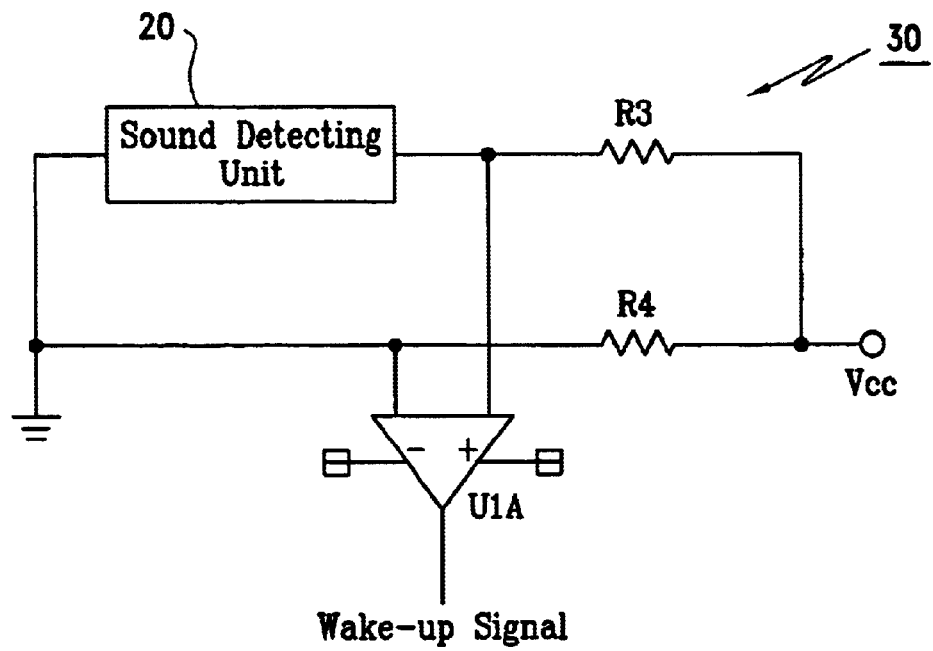

In the variation shown in FIG. 3B, transistor Q1 is replaced by a differential power amplifier U1A, which generates the wake-up signal when sound detecting unit 20 detects a sound. One input of the differential amplifier is again connected between a resistor R3 and the sound detecting unit 20, and the other input is connected between a resistor R4 and earth, the opposite ends of the resistors R3 and R4 being connected to the voltage source Vcc.

In either of the implementations illustrated in FIGS. 3A and 3B, the sound detecting unit may include sound filtering circuitry. In addition, those skilled in the art will appreciate that numerous other wake-up signal generating circuits may be substituted for the illustrated circuit, which is not intended to be taken as limiting.

By choosing appropriate sounds, the sound wake-up device can be made essentially immune from the unintended wake-ups to which a vibration or motion sensitive wake-up device is subject, without the need for repeated checking of a sensor at predetermined intervals, thereby substantially reducing power consumption.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

What is claimed is:

1. An input device comprising:

a housing; and a sound detecting device within the housing, wherein the input device includes a power-saving mode that cuts-off power to components of the input device if the input device is inactive for a predetermined period of time, and wherein the sound detecting device is arranged to detect a sound of a user seeking to operate the input device and to cause generation of a wake-up signal for ending said power-saving mode when said sound of the user is detected, wherein said sound of the user is a sound of the user touching the input device.

2. An input device comprising:

a housing; and a sound detecting device within the housing, wherein the input device includes a power-saving mode that cuts-off power to components of the input device if the input device is inactive for a predetermined period of time, and wherein the sound detecting device is arranged to detect a sound of a user seeking to operate the input device and to cause generation of a wake-up signal for ending said power-saving mode when said sound of the user is detected, wherein said device is arranged to be used on a platform, and said sound of the user is a sound of friction between the input device and the platform.

3. An input device as claimed in claim 2, wherein said platform is a desktop or mousepad.

4. An input device as claimed in claim 1, further comprising:

a micro control unit having said power-saving mode; and a signal amplifying/comparing unit connected to the sound detecting device for receiving signals representing detected sounds and supplying a wake-up signal to the micro control unit when said sound of the user is detected.

5. An input device as claimed in claim 4, wherein the amplifying/comparing unit comprises a transistor having a base connected to the sound detecting unit and one of a collector or emitter connected to the master control unit.

6. An input device as claimed in claim 4, wherein the amplifying/comparing unit device includes a differential amplifier for detecting an output signal of said sound detecting unit.

7. An input device as claimed in claim 1, wherein the sound detecting device includes a sound filter for filtering sounds associated with background noise.

8. An input device as claimed in claim 7, wherein said sound filter is a bandpass filter.

9. An input device as claimed in claim 1, wherein said housing includes sound-absorbing materials.

10. An input device as claimed in claim 1, wherein said input device is a wireless input device.

11. An input device as claimed in claim 1, wherein said input device is a wireless pointing device.

12. An input device as claimed in claim 2, further comprising:

a micro control unit having said power-saving mode; and a signal amplifying/comparing unit connected to the sound detecting device for receiving signals representing detected sounds and supplying a wake-up signal to the micro control unit when said sound of the user is detected.

13. An input device as claimed in claim 12, wherein the amplifying/comparing unit comprises a transistor having a base connected to the sound detecting unit and one of a collector or emitter connected to the master control unit.

14. An input device as claimed in claim 12, wherein the amplifying/comparing unit device includes a differential amplifier for detecting an output signal of said sound detecting unit.

15. An input device as claimed in claim 2, wherein the sound detecting device includes a sound filter for filtering sounds associated with background noise.

16. An input device as claimed in claim 15, wherein said sound filter is a bandpass filter.

17. An input device as claimed in claim 2, wherein said housing includes sound-absorbing materials.

18. An input device as claimed in claim 2, wherein said input device is a wireless input device.

19. An input device as claimed in claim 2, wherein said input device is a wireless pointing device.

* * * * *